(12) United States Patent
Shen et al.

(10) Patent No.: US 10,120,575 B2
(45) Date of Patent: Nov. 6, 2018

(54) DYNAMIC STORAGE TIERING

(71) Applicant: EMC Corporation, Hopkinton, MA (US)

(72) Inventors: Bruce Chen Shen, Chengdu (CN); Bob Biao Yan, Chengdu (CN); Huijuan Fan, Chengdu (CN); Su Yang, Chengdu (CN); Jessica Jing Ye, Chengdu (CN); Yu Wen, Chengdu (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 299 days.

(21) Appl. No.: 14/672,889

(22) Filed: Mar. 30, 2015

(65) Prior Publication Data

US 2015/0277773 A1    Oct. 1, 2015

(30) Foreign Application Priority Data

Mar. 31, 2014   (CN) .......................... 2014 1 0136587

(51) Int. Cl.
*G06F 12/00*   (2006.01)
*G06F 3/06*    (2006.01)

(52) U.S. Cl.
CPC .......... *G06F 3/0607* (2013.01); *G06F 3/0605* (2013.01); *G06F 3/068* (2013.01); *G06F 3/0649* (2013.01); *G06F 3/0653* (2013.01); *G06F 3/0665* (2013.01); *G06F 3/0685* (2013.01); *G06F 3/0689* (2013.01); *G06F 3/0647* (2013.01); *G06F 2003/0692* (2013.01)

(58) Field of Classification Search
None
See application file for complete search history.

(56) References Cited

U.S. PATENT DOCUMENTS

2012/0317355 A1*  12/2012  Ishizaki ............... G06F 3/0607
                                                711/114

\* cited by examiner

*Primary Examiner* — Brian Peugh
(74) *Attorney, Agent, or Firm* — Krishnendu Gupta; Konrad R. Lee

(57) ABSTRACT

Embodiments of the present disclosure provide a method and apparatus for dynamic storage tiering by calculating a density of data according to a temperature of the data, and making the density of data with a higher temperature smaller; obtaining density threshold of each of the tiers, wherein the density threshold of an upper tier is smaller than that of a lower tier; comparing the density of the data with the density threshold of each of the tiers to determine which tier the data should be moved to; and moving the data to the determined tier. Embodiments of the present invention may be used to provide a dynamic storage tiering scheme with higher flexibility and scalability.

6 Claims, 6 Drawing Sheets

DYNAMIC STORAGE TIERING

RELATED APPLICATION

This application claims priority from Chinese Patent Application Number CN201410136587.9 filed on Mar. 31, 2014 entitled "METHOD AND APPARATUS FOR DYNAMIC STORAGE TIERING" the content and teachings of which is herein incorporated by reference in its entirety.

FIELD OF THE INVENTION

Embodiments of the present invention generally relate to the field of data storage.

BACKGROUND OF THE INVENTION

Fully Automated Storage Tiering technology for Virtual Pools (FAST VP) optimizes storage pools automatically, and ensures that active data is being served from solid state drives (SSDs), while cold data is moved to lower cost disk tiers.

SUMMARY OF THE INVENTION

Embodiments of the present disclosure provide a dynamic storage tiering method and apparatus based on a buoyancy factor.

BRIEF DESCRIPTION OF THE DRAWINGS

The above and other objects, features and advantages of embodiments of the present disclosure will be made more apparent by reading through the following detailed depictions with reference to the following figures. In the figures, several embodiments of the present disclosure are illustrated in an exemplary but not restrictive manner, wherein.

Throughout the figures, the same or corresponding numerals refer to the same or corresponding parts.

DETAILED DESCRIPTION OF EMBODIMENTS

Figure 1:
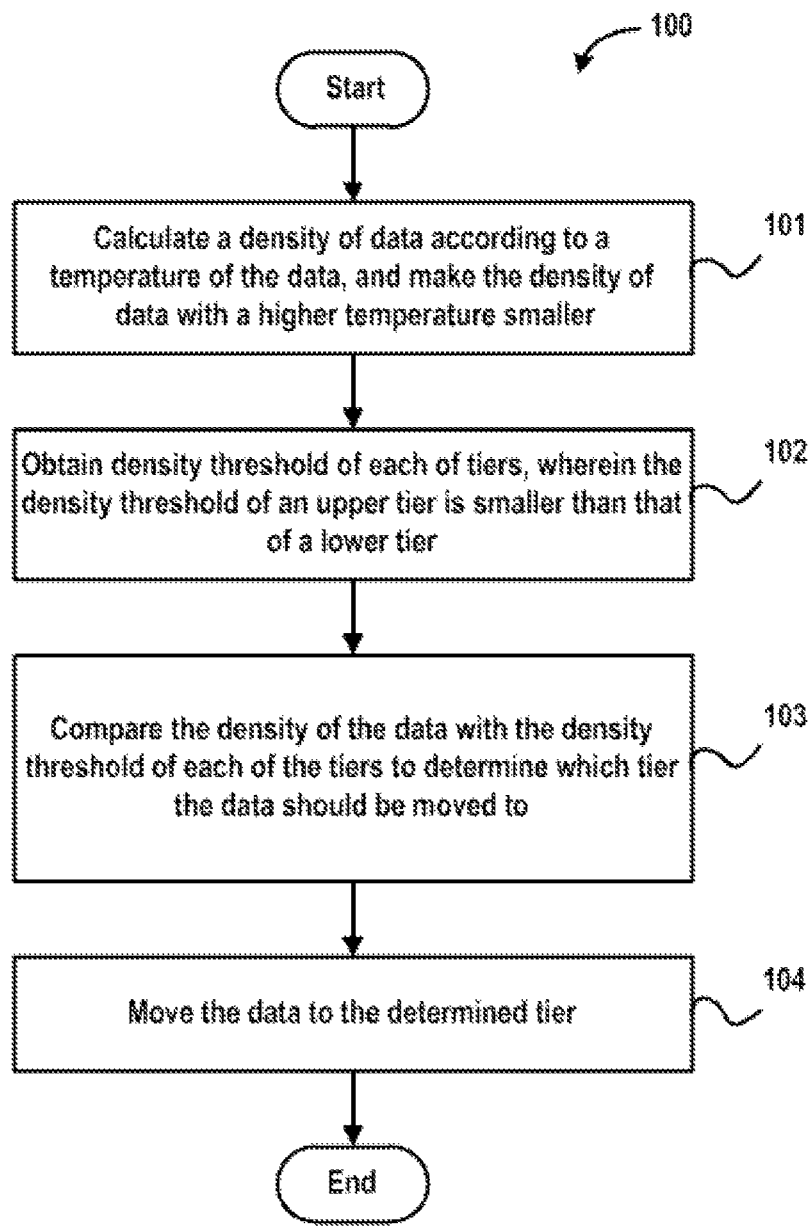
FIG. 1 illustrates an exemplary flow chart of a method for dynamic storage tiering according to an embodiment of the present disclosure.

The principles and spirit of the present invention are described below with reference to several exemplary embodiments shown in the figures. It should be appreciated that these embodiments are only intended to enable those skilled in the art to better understand and implement the present invention, not to limit the scope of the present invention in any manner. Embodiments of the present disclosure generally relate to the field of data storage, and more particularly to a dynamic storage tiering method and apparatus based on a buoyancy factor.

Generally, in current Auto-Tiering Policy Engine, the algorithms employed generally have the following characteristics: the computation cost of the algorithm may be low since only current IO activity and the latest temperature may be needed to update the temperature results. The calculation may give more weight (smoothing factor) to more recent IO activity history and less weight to older IO activity history. Smoothing factor may be easily adjusted to improve the prediction accuracy of slice temperature. The algorithm may effectively reduce the jitters of slice IO activity sample data. The algorithm may also support variable sampling interval without skew of temperature calculation result.

However, typically the current automatic storage tiering technology still has some disadvantages, and may not flexible and scalable. Typically, upon disk expansion, e.g., in the case that more flash disks need to be added to storage pools, flash memory tiers may contain more hot data. However, in the current solution, since a tiering model may be fixed, the flash memory tiers cannot correspondingly store more hot data. Besides, if more tiers need to be added, codes need to be changed in the current solution to suit a new tiering structure.

Embodiments of the present disclosure, by using the principle of buoyance, calculate density of data and density of each tier respectively, a position of data may depend on the relative relationship between the density of data and the density threshold of each tier, and data with a smaller density may be correspondingly moved to a tier with a smaller density threshold. In calculating the density threshold of each tier, embodiments of the present disclosure consider the storage capacity and the left storage capacity of each tier. Hence, when the capacity or left capacity of the storage device of each tier changes, the density threshold of each tier changes so as to dynamically adjust a tiering structure of a storage pool and improve flexibility and scalability.

Embodiments of the present disclosure provide a method for dynamic storage tiering. The method comprising: calculating a density of data according to a temperature of the data, and making the density of data with a higher temperature smaller; obtaining density threshold of each of tiers, wherein the density threshold of an upper tier is smaller than that of a lower tier; comparing the density of the data with the density threshold of each of the tiers to determine which tier the data should be moved to; and moving the data to the determined tier.

According to an embodiment of the present disclosure, the method further comprises: performing detection as to whether the determined tier has a sufficient storage capacity for movement of the data to move the data to the determined tier. According to a further embodiment of the present disclosure, the method further comprises: updating the density threshold of each of the tiers according to the left storage capacity of the determined tier if the determined tier does not have a sufficient storage capacity; comparing the density of the data with the updated density threshold of each of the tiers to re-determine which tier the data should be moved to; and moving the data to the re-determined tier.

According to a further embodiment of the present disclosure, the density threshold of each of the tiers is read from a memory. According to yet a further embodiment of the present disclosure, the density of each of the tiers is calculated according to the type of physical storage devices of each of the tiers, the storage capacity and the left storage capacity of each of the tiers, then the density threshold of each of the tiers is calculated according to the calculated density of each of the tiers, and the density threshold of each of the tiers is stored in the memory.

According to a further embodiment of the present disclosure, the method further comprises: re-calculating the density of each of the tiers according to a new type of the physical storage device and the storage capacity and left storage capacity of each of the tiers when the physical storage device changes, subsequently the density threshold of each of the tiers is re-calculated according to the updated density of each of the tiers, and the density threshold of each of the tiers is stored in the memory.

According to a further embodiment of the present disclosure, the comparing of the density of the data with the density threshold of each of the tiers to determine which tier the data should be moved to comprises: if the density of the data is smaller than the density threshold of a certain tier and greater than the density threshold of the tier above this tier, determining that the data should be stored to this tier (in the present tier).

According to a further embodiment of the present disclosure, the density of the data is calculated using the equation $$\rho_{data} = \beta \frac{1}{T},$$

wherein $\rho_{data}$ is the density of the data, T is the temperature of the data, and $\beta$ is an adjustment factor, which in one specific embodiment may be derived from experience.

According to a further embodiment of the present disclosure, the temperature of the data is calculated using the equation $$T = T' \cdot e^{-\alpha \cdot \Delta t} + \frac{\Delta H \cdot (1 - e^{-\alpha \cdot \Delta t})}{\alpha \cdot \Delta t},$$

wherein T represents the currently-calculated temperature of data; $\Delta t$ is a duration between a previous sampling time and a current sampling time; T' is a previously-calculated data temperature before the $\Delta t$ duration; $\alpha$ is a decay factor that is derived from a temperature exponential half-life decay period; $\Delta H$ is data I/O activity between a previous sampling time and a current sampling time; e represents a base of the natural logarithm.

According to a further embodiment of the present disclosure, the density of each of the tiers is calculated using the equation: $\rho_i = (\beta' T_{yi} + \alpha' C_i) \cdot \Delta C'_i$, wherein $\rho_i$ is the density of the $i^{th}$ tier; $T_{yi}$ is a value representing the physical storage type of the $i^{th}$ tier, and it is set to a different value for a different physical storage type according to an application environment; $\beta'$ is a storage type adjustment factor that is derived from experience; $C_i$ is the storage capacity of the $i^{th}$ tier; $\alpha'$ is a capacity adjustment factor, that is a specific embodiment may be derived from experience; and $\Delta C'_i$ is the left capacity factor of the $i^{th}$ tier that changes along with the left capacity of the $i^{th}$ tier.

According to a further embodiment of the present disclosure, $\Delta C'_i$ is determined as follows: when $\Delta C_i \geq \Delta C'_i = 1$; when $$\Delta C_i < \theta, \Delta C'_i = \frac{\Delta C_i}{\theta},$$

wherein $\Delta C_i$ is the left storage capacity of the $i^{th}$ tier; $\theta$ is a threshold of $\Delta C_i$ set by the user.

According to a further embodiment of the present disclosure, the density threshold of each of the tiers may be calculated using the equation: $\sigma_i = \rho_{i-1} + \rho_i$, wherein $\sigma_i$ is the density threshold of the $i^{th}$ tier, and $\rho_0 = 0$, and $\sigma_0 = 0$.

According to a further embodiment of the present disclosure, comparing the density of the data with the density threshold of each of the tiers to determine which tier the data should be moved to further comprises: determining that the data should be moved to the $i^{th}$ tier if $\sigma_{i-1} < \rho_{data} < \sigma_i$.

According to a further embodiment of the present disclosure, the dynamic storage tiers comprise three tiers. According to yet a further embodiment of the present disclosure, the method further comprises: setting a time and moving each of a plurality of data to the corresponding tiers after expiration of the set time.

Embodiments of the present disclosure further provide a dynamic storage tiering apparatus. The apparatus comprising: a first calculating unit configured to calculate a density of data according to a temperature of the data, and make the density of data with a higher temperature smaller; an obtaining unit configured to obtain density threshold of each of the tiers, wherein the density threshold of an upper tier is smaller than that of a lower tier; a determining unit configured to compare the density of the data with the density threshold of each of the tiers to determine which tier the data should be moved to; and a moving unit configured to move the data to the determined tier. In one specific embodiment, the first calculating unit, the obtaining unit, the determining unit and the moving unit may all be combined into a single facilitating unit, which may be configured to collectively perform the tasks associated with each of the individual units in an ordered manner to provide dynamic storage tiering, which may be based on a buoyancy factor.

Embodiments of the present disclosure may be used to provide a dynamic storage tiering scheme with higher flexibility and scalability. Particularly in the event of disk expansion, e.g., when a new flash disk is added to the storage pool, the tier density of the expanded flash tier may change correspondingly so that more hot data can be automatically moved to the flash disk in the tiering structure provided by embodiments of the present disclosure, as compared with the fixed tiering structure. Besides, if more tires need to be added, the codes of the tiering structure provided by embodiments of the present disclosure by no means needs to be changed.

FIG. 1 illustrates an exemplary flow chart of a method 100 for dynamic storage tiering according to an embodiment of the present disclosure. Those skilled in the art should appreciate that steps recited in the method 100 may be executed in different orders, and/or executed concurrently. The method 100 may further comprise additional steps and/or omit execution of shown steps. The scope of the present disclosure may not be limited in this regard.

In step 101, a density of data is calculated according to a data temperature of the data, and the density of data with higher data temperature is made smaller.

In embodiments of the present disclosure, the data temperature refers to a parameter related to frequency degree of data activity, the number of times of the data is being accessed, or stay duration. Data with a high temperature, namely, hot data, refers to data with a high activity frequency, more times the data is accessed (more data accessing times) or shorter stay duration. In contrast, data with a low temperature, namely, cold data, refers to data with less frequent activity, less times that the data is accessed (less data accessing times) or longer stay duration.

In some embodiment, according to the calculated data temperature, data is correspondingly moved to data tiers with hot data being moved to higher tiers and cold data being moved to lower tiers.

In order to use buoyance factor to improve the automatic storage tiering technology, embodiments of the present disclosure creatively introduce the concept "density" to data, and introduce the concept "density threshold" to each tier correspondingly. As such, data, like having "buoyance", is automatically moved to a corresponding tier based on the relationship between its density and the density threshold of each of the tiers.

According to an embodiment of the present disclosure, the density of data may be calculated according to the temperature of the data, and the density of data with a higher temperature is made smaller. As such, the hotter data has a smaller density and may be moved to an upper tier; and the colder data has a greater density that may be moved to a lower tier.

According to another embodiment of the present disclosure, the density of the data may be inversely proportional to the data temperature, namely, $$\rho_{data} = \beta \frac{1}{T},$$

wherein $\rho_{data}$ is the density of the data, T is data temperature, and $\beta$ is an adjustment factor, for example in a specific embodiment the adjustment factor may be derived from experience.

According to a further embodiment of the present disclosure, the data temperature is calculated using the equation $$T = T' \cdot e^{-\alpha \cdot \Delta t} + \frac{\Delta H \cdot (1 - e^{-\alpha \cdot \Delta t})}{\alpha \cdot \Delta t},$$

where T represents the currently-calculated data temperature; $\Delta t$ is a duration between a previous sampling time and a current sampling time; T' is a previously-calculated data temperature before the $\Delta t$ duration; $\alpha$ is an decay factor that is derived from a temperature exponential half-life decay period; $\Delta H$ is data I/O activity between a previous sampling time and a current sampling time; e is the base of the natural logarithm.

It should be appreciated that without departing from the spirit and scope of the present disclosure, those skilled in the art may calculate the data temperature by various other methods, and may design a formula for calculating the density of the data according to the data temperature according to specific application environments. The scope of the present disclosure is not limited in these aspects.

In step 102, the density threshold of each of the tiers is obtained, wherein the density threshold of an upper tier is smaller than that of a lower tier.

According to embodiments of the present disclosure, in order to apply the buoyance factor to the automatic tiering storage technology, besides introducing the concept "density" to the data, it is required to correspondingly introduce the concept "density threshold" to each of storage tiers and establish an architecture wherein the storage tiers are arranged from top to bottom in sequence. Specifically, the density threshold of an upper tier should be made smaller than that of a lower tier so that the data with a smaller density is stored to an upper tier. As such, the data may be moved to a corresponding tier according to the relationship between the density of the data and the density threshold of each of the tiers.

According to an embodiment of the present disclosure, the density threshold of each of the tiers may be read from a memory which stores the previously-calculated density threshold of each of the tiers.

According to an embodiment of the present disclosure, the density threshold of each of the tiers may be calculated according to the density of each of the tiers and stored in the memory to obtain the density threshold of each of the tiers during movement of the data to the corresponding tiers and compare the density threshold of each of the tiers with the density of the data to finally determine which tier the data should be moved to.

Figure 2:
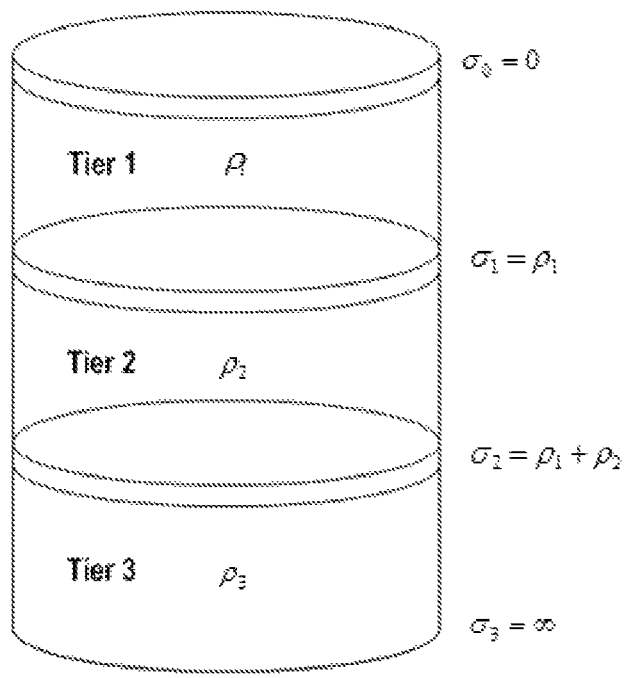
FIG. 2 illustrates an exemplary tiering diagram according to an embodiment of the present disclosure.

According to an embodiment of the present disclosure, the tiering structure of the storage pool is divided into three tiers, as illustrated in an exemplary embodiment in FIG. 2. In FIG. 2, the upmost tier is tier 1, and tier 2 and tier 3 follow downwardly in sequence. A boundary $\sigma_1$ between tier 1 and tier 2 is the density threshold of tier 1, and a boundary $\sigma_2$ between tier 2 and tier 3 is the density threshold of tier 2. According to a preferred embodiment of the present disclosure, the lower limit threshold $\sigma_0$ of tier 1 may be set to zero. According to another preferred embodiment, since tier 3 is the bottommost tier, the threshold of tier 3 may be set to be a positive infinite to avoid the issue that data may be stored nowhere. Alternatively, the density threshold of tier 3 as the bottommost tier may be set to $\sigma_3 = \rho_1 + \rho_2 + \rho_3$, and the maximum value of the density of the data may be correspondingly specified to be $\rho_1 + \rho_2 + \rho_3$. It should be appreciated that the above value is only exemplary in nature. Those skilled in the art may set them as other values according to specific application environments and correspondingly limit the value of the density of the data. It should also be appreciated that the three-tier tiering structure is only an example, and has been used for sake of simplicity. The present application may apply the concept discussed with respect to the three-tier structure to a tiering structure that has any number of tiers.

According to an embodiment of the present disclosure, the density threshold of each of the tiers may be calculated according to the following equation: $\sigma_i = \rho_{i-1} + \rho_i$, wherein $\sigma_i$ is the density threshold of the $i^{th}$ tier, and $\rho_i$ is the tier density of the $i^{th}$ tier; and suppose $\rho_0 = 0$, and $\sigma_0 = 0$, the density threshold of the first tier is $\sigma_1 = \rho_1$, and the density threshold of the second tier is $\sigma_2 = \rho_1 + \rho_2$. It should be note that in the example shown in FIG. 2, the storage pool is divided into three tiers, that is, the third tier is the bottommost tier, so $\sigma_3 = \infty$ in the example illustrated in FIG. 2. However, it should be appreciated that if there is a fourth tier or further upper tiers, the density threshold of the third tier is set to $\sigma_3 = \rho_1 + \rho_2 + \rho_3$, the density threshold of the fourth tier is set to $\sigma_4 = \rho_1 + \rho_2 + \rho_3 + \rho_4$, and so on so forth. Certainly, the density threshold of the bottommost tier may not be set to positive infinite in an alternative manner, and the maximum value of the density of data may correspondingly be specified to be the density threshold of the bottommost tier.

It should be appreciated that without departing from the spirit and scope of the present disclosure, that those skilled in the art may calculate the density threshold by various other methods according to the density of each of the tiers, and may design a specific formula for adjusting and calculating the density of each of the tiers according to specific application environments, and the scope of the present disclosure is not limited in these aspects.

According to an embodiment of the present disclosure, the density $\rho_i$ of each of the tiers may be calculated without limitation according to parameters such as a type $T_{yi}$ of a physical storage device of each of the tiers, storage capacity $C_i$ of each of the tiers and left storage capacity $\Delta C_i$ (remaining storage capacity). In data storage, a memory with a faster access speed is usually used to store hot data, whereas a memory with a slower access speed is used to store cold data. Hence, the type of the physical storage device may be considered upon calculating the density of each of the tiers. Besides, in data storage, massive data is usually not often accessed and therefore has a lower temperature, and a storage tier with a large capacity should be used to store the massive data. Hence, the storage capacity $C_i$ of each of the tiers may be considered upon calculating the density of each of the tiers. As will be described below in detail, according to the method of calculating the density $\rho_i$ of each of the tiers, when the capacity of a certain tier changes, e.g., when a new storage device is added or the original storage devices are reduced, the density of the corresponding storage tier may change so that the automatic tiering structure according to the embodiment of the present disclosure may have greater flexibility and scalability. Furthermore, the left storage capacity $\Delta C_i$ of a tier is also considered upon calculating the density $\rho_i$ of each of the tiers. Therefore, the density $\rho_i$ of each of the tiers may change with changes of the left storage capacity $\Delta C_i$, which further increases the flexibility of the automatic tiering structure according to the embodiment of the present disclosure.

According to another embodiment of the present disclosure, the density of each of the tiers may be calculated using the following equation: $\rho_i=(\beta'T_{yi}+\alpha'C_i)\cdot\Delta C'_i$, wherein $\rho_i$ is the density of the $i^{th}$ tier; $T_{yi}$ is a value representing the physical storage type of the $i^{th}$ tier, and it is set to a different value for a different physical storage type according to application environments; $\beta'$ is a storage type adjustment factor that is derived from experience; $C_i$ is the storage capacity of the $i^{th}$ tier; $\alpha'$ is a capacity adjustment factor, that in a specific embodiment may be derived from experience; and $\Delta C'_i$ is the left capacity factor of the $i^{th}$ tier which changes along with the left capacity of the $i^{th}$ tier.

According to another embodiment of the present disclosure, $\Delta C'_i$ may be determined in the following manner: when $\Delta C_i \geq \theta$, $\Delta C'_i=1$; and when $$\Delta C_i < \theta, \Delta C'_i = \frac{\Delta C_i}{\theta},$$

wherein $\Delta C_i$ is the left storage capacity (remaining storage capacity) of the $i^{th}$ tier; $\theta$ is a threshold of $\Delta C_i$ set by the user. The user may set the value of the threshold $\theta$ according to the actual application environment and requirements. If the left capacity of a certain tier is smaller than threshold $\theta$, the density of this tier begins to be reduced in proportion.

It should be appreciated that without departing from the spirit and scope of the present disclosure, that those skilled in the art may calculate the density of each of the tiers by various method, e.g., calculate the density of each of the tiers according to more parameters or less parameters, and may design a specific formula of calculating the density of each of the tiers based on the parameters according to specific application environments. Besides, without departing from the spirit and scope of the present disclosure, those skilled in the art may further, according to the tier left capacity (remaining tier capacity), design a tier left capacity factor different from the tier left capacity factor as described in the embodiments described in the present disclosure. The scope of the present disclosure is not limited in these aspects.

In step 103, the density of data is compared with the density threshold of each of the tiers to determine which tier the data should be moved to.

According to an embodiment of the present disclosure, if the density of the data is smaller than the density threshold of a certain tier and greater than the density threshold of the tier above this tier, it is determined that the data should be stored to this tier. That is to say, if $\sigma_{i-1}<\rho_{data}<\sigma_i$, it is determined that the data should be moved to the $i^{th}$ tier and meanwhile it is supposed that $\sigma_0=0$.

According to another embodiment of the present disclosure, it may be determined which tier the data is moved to according to a proportional relationship between the density of data and the density threshold of each of the tiers.

It should be appreciated that without departing from the spirit and scope of the present disclosure, those skilled in the art may also design other manners to determine which tier the data should be moved to by comparing the density of the data with the density threshold of each of the tiers. The scope of the present disclosure is not limited in this regard.

In step 104, the data is moved to the determined tier.

Figure 3:
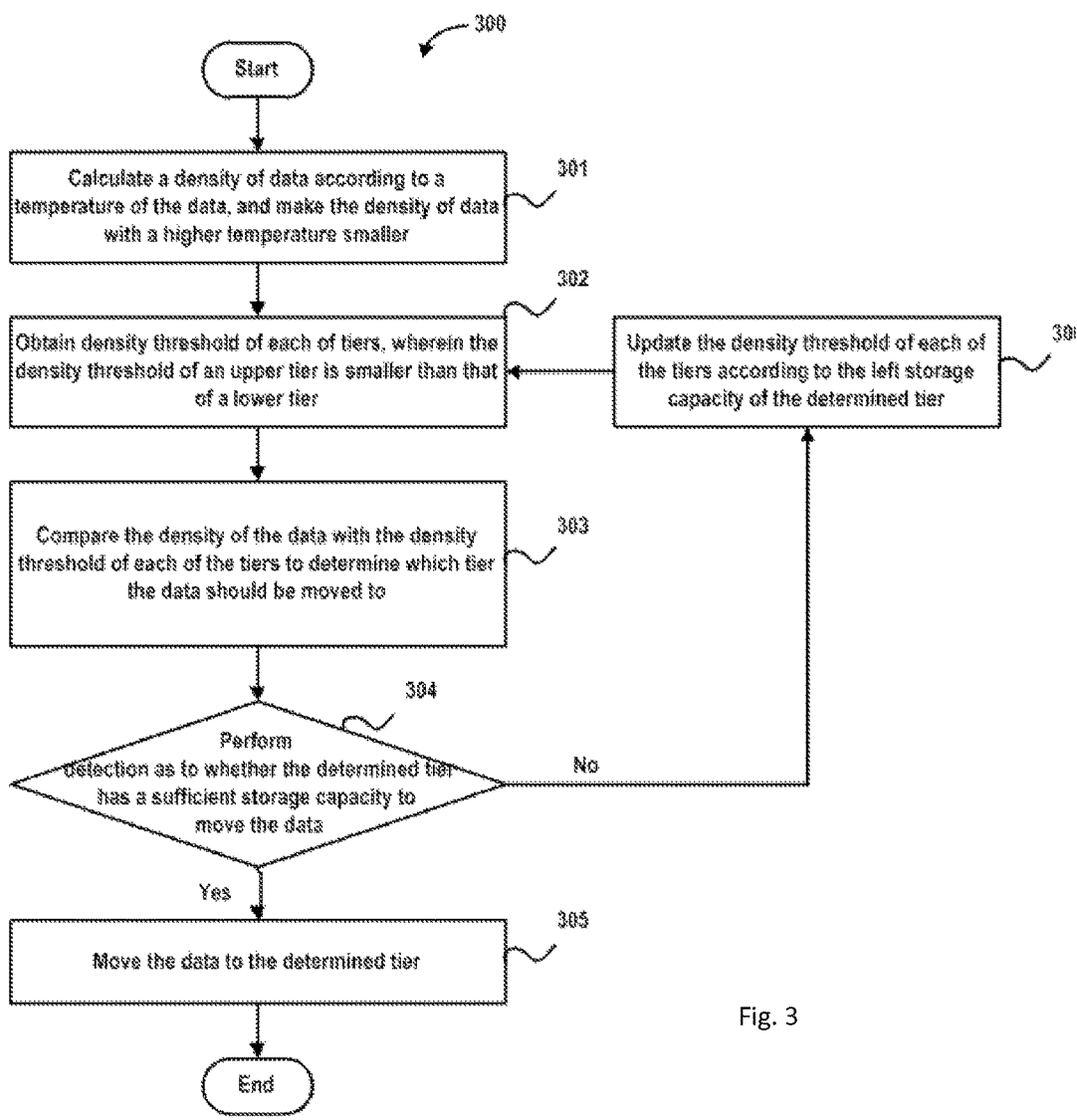
FIG. 3 illustrates an exemplary flow chart of a method for dynamic storage tiering according to another embodiment of the present disclosure.

FIG. 3 illustrates an exemplary flow chart of a method 300 for dynamic storage tiering according to another embodiment of the present disclosure. Those skilled in the art should appreciate that steps recited in the method 300 may be executed in different orders, and/or executed concurrently. The method 300 may further comprise additional steps and/or omit execution of shown steps. The scope of the present disclosure is not limited in this regard.

Steps 301-303 in FIG. 3 are identical with steps 101-103 in FIG. 1, and are not discussed here again. Differences between the method 300 and the method 100 are described below. In step 302, the obtained density threshold may be the density threshold of each of the tiers calculated in a certain previous time according to parameters such as the left capacity (remaining capacity) of each of the tiers at that time, so there might occur a situation in which the left capacity of the determined tier is insufficient to store the current data when the current data is moved.

Based on this consideration, according to an embodiment of the present disclosure, the method 300 comprises a detection step, namely, step 304, before moving the data to the determined tier. In the step 304, detection is performed as to whether the determined tier has a sufficient storage capacity for movement of the data to move the data to the determined tier.

If a sufficient storage capacity is detected in the determined tier in step 304, the method 300 proceeds to step 305. In step 305, the data is moved to the determined tier.

If an insufficient storage capacity is detected in the determined tier in step 304, the method 300 proceeds to step 306. In step 306, the density threshold of each of the tiers is updated according to the new left (remaining) storage capacity of the tier.

According to an embodiment of the present disclosure, a new tier density of this tier may be calculated according to parameters such as the type of the physical storage device of the tier, the storage capacity of the tier and the new left (remaining) storage capacity. Then, the density threshold of each of the tiers may be calculated according to the tier density of each of the tiers.

After updating the density threshold of each of the tiers, the method 300 returns to step 302. In step 302, new density threshold of each of the tiers is obtained.

Then, the method 300 proceeds to step 303. In step 303, the density of the data is compared with the updated density threshold of each of the tiers to re-determine which tier the data should be moved to.

Thereafter, the method 300 again comes to the step 304. Since the threshold of each of the tiers is already updated, at this time it is necessary to detect that the re-determined tier has a sufficient storage capacity to store the data in step 304.

Finally, the method 300 proceeds to step 305. In step 305, the data is moved to the re-determined tier.

Figure 4:
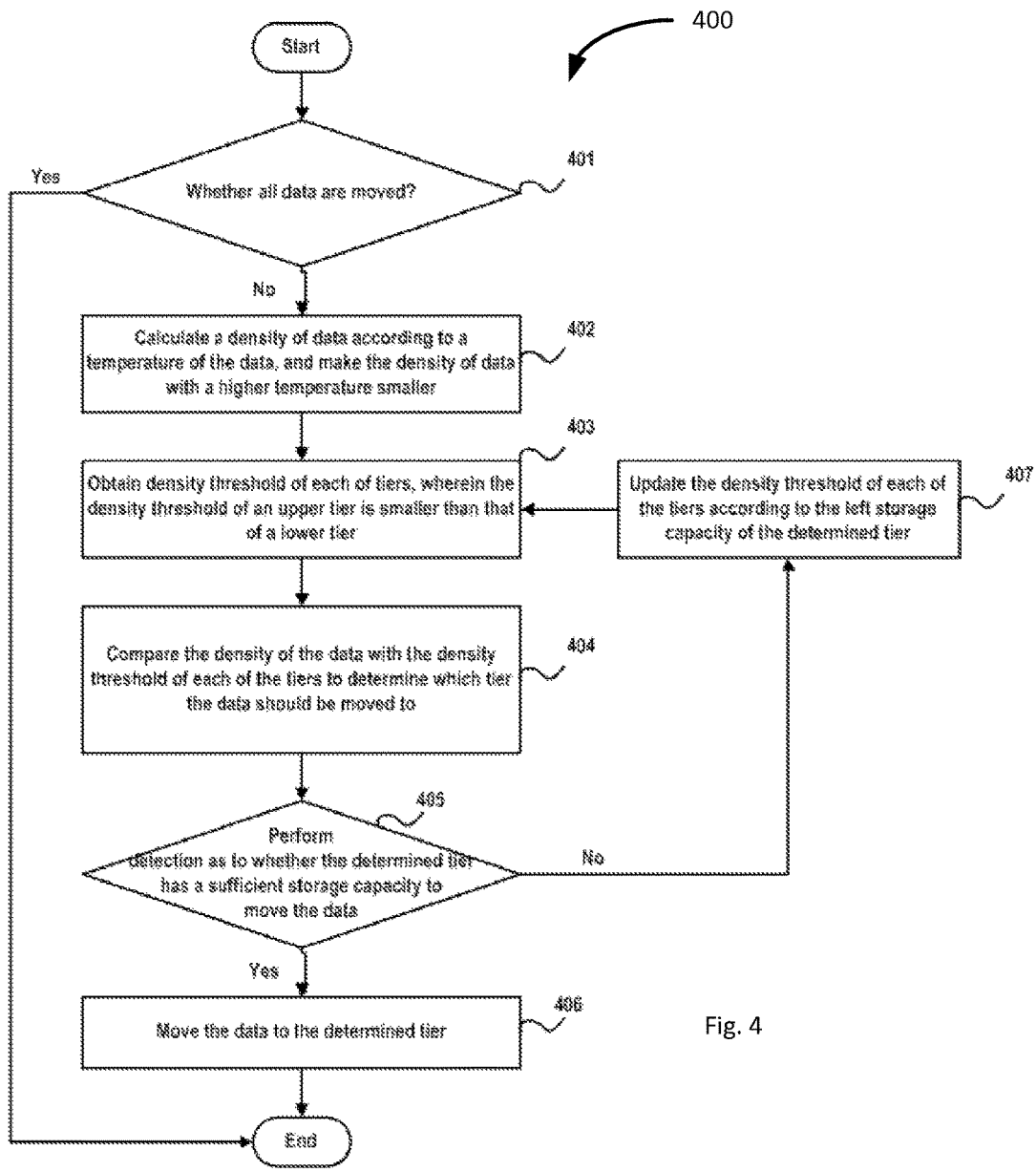
FIG. 4 illustrates an exemplary flow chart of a method for dynamic storage tiering according to a further embodiment of the present disclosure.

FIG. 4 illustrates an exemplary flow chart of a method 400 for dynamic storage tiering according to a further embodiment of the present disclosure. Those skilled in the art should appreciate that steps recited in the method 400 may be executed in different orders, and/or executed concurrently. The method 400 may further comprise additional steps and/or omit execution of shown steps. The scope of the present disclosure is not limited in this regard.

The method 400 is used to batch process movement and re-scanning of a plurality of data in one step. The method 400 is more advantageous than the method 100 and method 300 in that the user may select a time period in which the system is not so busy to move the plurality of data to the corresponding tiers so as to avoid influence on other operations of the system due to the resources occupied by movement of the data.

According to an embodiment of the present disclosure, the method 400 may be executed after expiration of a time set by the user to move each of the plurality of data to the corresponding tiers. According to a preferred embodiment of the present disclosure, before the method 400 is executed, all data needs to be moved is retrieved from a memory and then the method 400 starts.

After the start, the method 400 proceeds to step 401. In step 401, detection is performed as to whether all data needs to be moved is already moved to the corresponding tiers.

If it is detected that all data needs to be moved are not yet moved to the corresponding tiers in step 401, the method 400 proceeds to step 402 and then proceeds to subsequent steps. Steps 402-407 of the method 400 are identical with steps 301-306 of the method 300, and are not discussed here in detail.

If it is detected that all data needs to be moved are already moved to the corresponding tiers in step 401, the method 400 ends.

Figure 5:
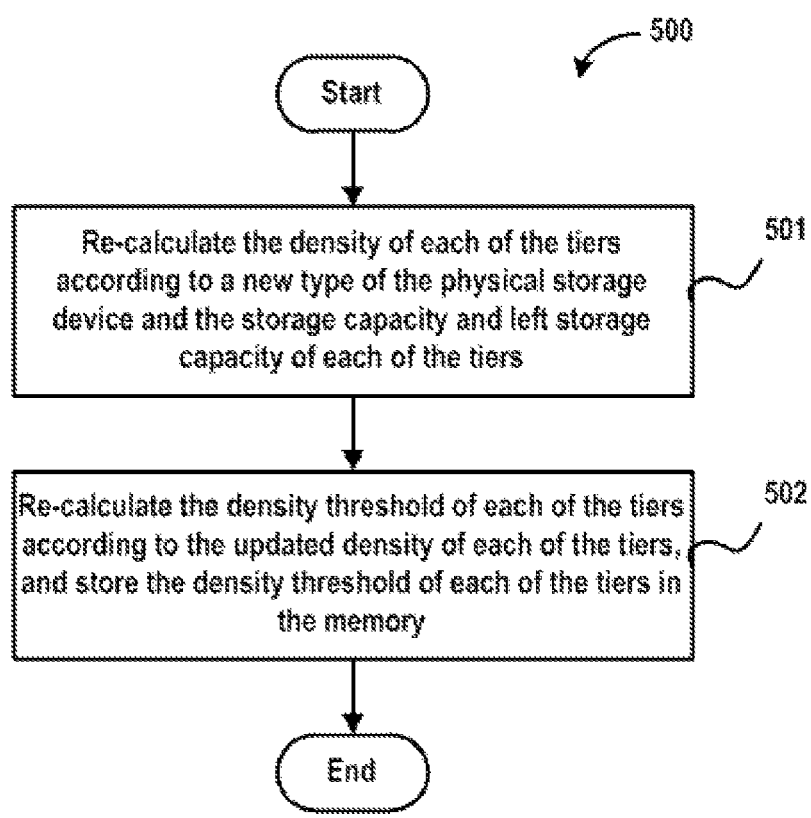
FIG. 5 illustrates an exemplary flow chart of a method for updating a tier density threshold when a storage device changes according to an embodiment of the present disclosure.

FIG. 5 illustrates an exemplary flow chart of a method 500 for updating a tier density threshold when a storage device changes according to an embodiment of the present disclosure. Those skilled in the art should appreciate that steps recited in the method 500 may be executed in different orders, and/or executed concurrently. The method 500 may further comprise additional steps and/or omit execution of shown steps. The scope of the present disclosure is not limited in this regard.

The method 500 is used to adaptively change the density threshold of each of the tiers when the storage device of each tier in the storage pool changes during running/execution. The flexibility and scalability of the dynamic storage tiering method and apparatus proposed by embodiments of the present disclosure are embodied through the method 500. The density threshold of each of the tiers may dynamically change along with the changes of the devices so that the tiers capable of storing more hot data can actually store more hot data, and the codes do not need any change when the tier structure changes.

In step 501, the density of each of the tiers is re-calculated according to the new type of the physical storage device and the storage capacity and left storage capacity of each of the tiers.

In step 502, the density threshold of each of the tiers is re-calculated according to the updated density of each of the tiers, and the updated density threshold of each of the tiers is stored in the memory.

Figure 6:
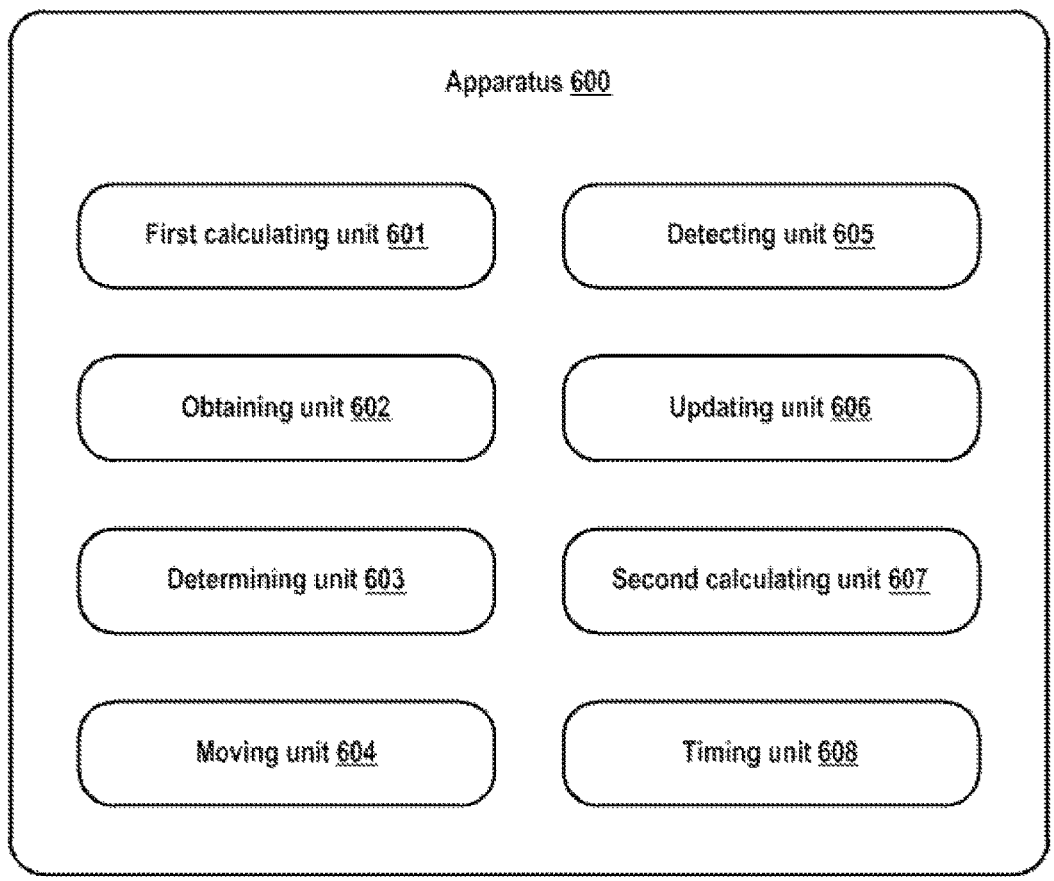
FIG. 6 illustrates an exemplary block diagram of an apparatus for dynamic storage tiering according to an embodiment of the present disclosure.

FIG. 6 illustrates a block diagram of an exemplary apparatus 600 for dynamic storage tiering according to an embodiment of the present disclosure. The apparatus 600 may be used to execute methods 100, 300, 400 and 500 according to embodiments of the present disclosure.

The apparatus 600 comprises a first calculating unit 601, an obtaining unit 602, a determining unit 603 and a moving unit 604. The first calculating unit 601 is configured to calculate a density of data according to a temperature of the data, and make the density of data with a higher temperature smaller; the obtaining unit 602 is configured to obtain density threshold of each of the tiers, wherein the density threshold of an upper tier is smaller than that of a lower tier; the determining unit 603 is configured to compare the density of the data with the density threshold of each of the tiers to determine which tier the data should be moved to; and the moving unit 604 is configured to move the data to the determined tier.

According to an embodiment of the present disclosure, the apparatus 600 may further comprise: a detecting unit 605. The detecting unit 605 is configured to perform detection as to whether the determined tier has a sufficient storage capacity for movement of the data to move the data to the determined tier.

According to an embodiment of the present disclosure, the apparatus 600 may further comprise: an updating unit 606. The updating unit 606 is configured to update the density threshold of each of the tiers according to the left storage capacity of the determined tier if the determined tier does not have a sufficient storage capacity.

According to an embodiment of the present disclosure, the determining unit 603 may be further configured to compare the density of the data with the updated density threshold of each of the tiers to re-determine which tier the data should be moved to.

According to an embodiment of the present disclosure, the moving unit 604 may be further configured to move the data to the re-determined tier.

According to an embodiment of the present disclosure, the obtaining unit 602 may be further configured to read the density threshold of each of the tiers from a memory.

According to an embodiment of the present disclosure, the apparatus 600 may further comprise: a second calculating unit 607. The second calculating unit 607 may be configured to calculate the density of each of the tiers according to parameters such as the type of physical storage device of each of the tiers, storage capacity and left storage capacity of each of the tiers, then calculate the density threshold of each of the tiers according to the calculated density of each of the tiers, and store the density threshold of each of the tiers in the memory.

According to an embodiment of the present disclosure, the second calculating unit 607 may be further configured to re-calculate the density of each of the tiers according to the new type of the physical storage device and the storage capacity and left (remaining) storage capacity of each of the tiers when the physical storage device changes, then recalculate the density threshold of each of the tiers according to the updated density of each of the tiers, and store the updated density threshold of each of the tiers in the memory.

According to an embodiment of the present disclosure, the determining unit 603 may be further configured to, if the density of the data is smaller than the density threshold of a certain tier and greater than the density threshold of the tier above this tier, determine that the data should be stored to this tier.

According to an embodiment of the present disclosure, the first calculating unit 601 may calculate the density of the data according to the equation $$\rho_{data} = \beta \frac{1}{T},$$

wherein $\rho_{data}$ is the density of the data, T is the data temperature, and $\beta$ is an adjustment factor, in a specific embodiment the adjustment factor may be derived from experience.

According to an embodiment of the present disclosure, the first calculating unit 601 may calculate the data temperature according to the following equation $$T = T' \cdot e^{-\alpha \cdot \Delta t} + \frac{\Delta H \cdot (1 - e^{-\alpha \cdot \Delta t})}{\alpha \cdot \Delta t},$$

wherein T represents the currently-calculated data temperature; $\Delta t$ is a duration between a previous sampling time and a current sampling time; T' is a previously-calculated data temperature before the $\Delta t$ duration; $\alpha$ is an decay factor that is derived from a temperature exponential half-life decay period; $\Delta H$ is data I/O activity between a previous sampling time and a current sampling time; e is the base of the natural logarithm.

According to an embodiment of the present disclosure, the second calculating unit 607 may calculate the density of each of the tiers according to the following equation: $\rho_i = (\beta'T_{yi} + \alpha'C_i) \cdot \Delta C'_i$, wherein $\rho_i$ is the density of the $i^{th}$ tier; $T_{yi}$ is a value representing the physical storage type of the $i^{th}$ tier, and it is set to a different value for a different physical storage type according to application environments; $\beta'$ is a storage type adjustment factor which is derived from experience; $C_i$ is the storage capacity of the $i^{th}$ tier; $\alpha'$ is a capacity adjustment factor, which in one specific embodiment may be derived from experience; and $\Delta C'_i$ is the left (remaining) capacity factor of the $i^{th}$ tier which changes along with the left capacity of the $i^{th}$ tier.

According to an embodiment of the present disclosure, the second calculating unit 607 may determine $\Delta C'_i$ in the following manner: when $\Delta C_i \geq \theta$, $\Delta C'_i = 1$; when $$\Delta C_i < \theta, \Delta C'_i = \frac{\Delta C_i}{\theta},$$

wherein $\Delta C_i$ is the left storage capacity of the $i^{th}$ tier; $\theta$ is a threshold of $\Delta C_i$ set by the user.

According to an embodiment of the present disclosure, the second calculating unit 607 may calculate the density threshold of each of the tiers according to the following equation: $\sigma_i = \rho_{i-1} + \rho_i$, wherein $\sigma_i$ is the density threshold of the $i^{th}$ tier, and $\rho_0 = 0$, and $\sigma_0 = 0$.

According to an embodiment of the present disclosure, the determining unit 603 may further be configured to, if $\sigma_{i-1} < \rho_{data} < \sigma_i$, determine that the data should be moved to the $i^{th}$ tier.

According to an embodiment of the present disclosure, the apparatus 600 may further comprise: a timing unit 608. The timing unit 608 is configured to set a time and move each of the plurality of data to the corresponding tiers after expiration of the set time.

In one specific embodiment, first calculating unit 601, obtaining unit 602, determining unit 603, moving unit 604, detecting unit 605, updating unit 606, second calculating unit 607 and timing unit 608 may all be combined into a single facilitating unit (not shown in the Fig.), which may be configured to collectively perform the tasks associated with each of the individual units in an ordered manner to provide dynamic storage tiering, which may be based on a buoyancy factor It should be noted that, the embodiments of the present disclosure can be implemented in software, hardware or the combination thereof. The hardware part can be implemented by a special logic; the software part can be stored in a memory and executed by a proper instruction execution system such as a microprocessor or a design-specific hardware. The normally skilled in the art may understand that the above method and system may be implemented with a computer-executable instruction and/or in a processor controlled code, for example, such code is provided on a bearer medium such as a magnetic disk, CD, or DVD-ROM, or a programmable memory such as a read-only memory (firmware) or a data bearer such as an optical or electronic signal bearer. The apparatuses and their modules in the present disclosure may be implemented by hardware circuitry of a programmable hardware device such as a very large scale integrated circuit or gate array, a semiconductor such as logical chip or transistor, or a field-programmable gate array, or a programmable logical device, or implemented by software executed by various kinds of processors, or implemented by combination of the above hardware circuitry and software.

It should be noted that although a plurality of means or sub-means of the device have been mentioned in the above detailed depiction, such partitioning is merely non-compulsory. In actuality, according to the embodiments of the present disclosure, the features and functions of the above described two or more means may be embodied in one means. In turn, the features and functions of the above described one means may be further embodied in more modules.

Besides, although operations of the present method are described in a particular order in the drawings, it does not require or imply that these operations must be performed according to this particular sequence, or a desired outcome can only be achieved by performing all shown operations. On the contrary, the execution order for the steps as depicted in the flowcharts may be varied. Additionally or alternatively, some steps may be omitted, a plurality of steps may be merged into one step, or a step may be divided into a plurality of steps for execution.

Although the present disclosure has been depicted with reference to a plurality of embodiments, it should be understood that the present disclosure is not limited to the disclosed embodiments. On the contrary, the present disclosure intends to cover various modifications and equivalent arrangements included in the spirit and scope of the appended claims. The scope of the appended claims meets the broadest explanations and covers all such modifications and equivalent structures and functions.

What is claimed is:

1. A method for dynamic storage tiering comprising:
computing a density of data according to a temperature associated with data, wherein a higher temperature of data indicates a smaller density of data;
obtaining a density threshold of each of a plurality or tiers, wherein the density threshold of an upper tier is assigned to be smaller than the density threshold of a lower tier;
comparing the density of data with the density threshold of each of the plurality of tiers to determine which tier amongst the plurality of tiers the data should be moved to;
moving the data to the determined tier;
wherein the density threshold of each of the plurality of tiers is enabled to be modified;
performing detection as to whether the determined tier has a sufficient storage capacity for movement of the data to the determined tier:
updating the density threshold of each of the plurality of tiers according to the remaining storage capacity of the determined tier if the determined tier does not have a sufficient storage capacity;
comparing the density of data with an updated density threshold of each of the tiers to re-determine which tier the data should be moved to, wherein the density of data is calculated according to the equation $\rho(data)=\beta (1/T)$, wherein $\rho_{data}$ is the density of data, T is the temperature of the data, and $\beta$ is an adjustment factor; and
moving the data to the re-determined tier.

2. The method according to claim 1, wherein the temperature of the data is calculated according to the following equation $$T = T' \cdot e^{-\alpha \cdot \Delta t} + \frac{\Delta H \cdot (1 - e^{-\alpha \cdot \Delta t})}{\alpha \cdot \Delta t},$$

wherein T represents the currently-calculated data temperature; $\Delta t$ is a duration between a previous sampling time and a current sampling time; T' is a previously-calculated data temperature before the $\Delta t$ duration; $\alpha$ is an decay factor derived from a temperature exponential half-life decay period; $\Delta H$ is data I/O activity between a previous sampling time and a current sampling time; e is a base of the natural logarithm.

3. A method for dynamic storage tiering comprising:
a. computing a density of data according to a temperature associated with data, wherein a higher temperature of data indicates a smaller density of data wherein the density of each of the plurality of tiers is calculated according to the following equation: $\rho_i=(\beta'T_{yi}+\alpha'C_i) \cdot \Delta C'_i$, wherein $\rho_i$ is the density of the $i^{th}$ tier; $T_{yi}$, represents the physical storage type of the $i^{th}$ tier, the value being dependent on the application environments; $\beta'$ is a storage type adjustment factor; $C_i$ is the storage capacity of the $i^{th}$ tier; $\alpha'$ is a capacity adjustment factor; and $\Delta C'_i$ is the left capacity factor of the $i^{th}$ tier which changes along with the remaining capacity of the $i^{th}$ tier;
b. obtaining a density threshold of each of a plurality of tiers, wherein:
  i. the density threshold of an upper tier is assigned to be smaller than the density threshold of a lower tier;
  ii. the density threshold of each of the plurality of tiers is read from a memory;
  iii. the density of each of the plurality of tiers is computed according to the type of physical storage device of each of the tiers, the storage capacity and the remaining storage capacity of each of the plurality of tiers; and
  iv. the density threshold of each of the plurality of tiers is computed according to the calculated density of each of the plurality of tiers, and the density threshold of each of the plurality of tiers is stored in the memory;
c. comparing the density of data with the density threshold of each of the plurality of tiers to determine which tier amongst the plurality of tiers the data should be moved to;
d. moving the data to the determined tier, wherein the density threshold of each of the plurality of tiers is enabled to be modified;
e. performing detection as to whether the determined tier has a sufficient storage capacity for movement of the data to the determined tier;
f. updating the density threshold of each of the plurality of tiers according to the remaining storage capacity of the determined tier if the determined tier does not have a sufficient storage capacity;
g. comparing the density of data with an updated density threshold of each of the tiers to re-determine which tier the data should be moved to; and
h. moving the data to the re-detemined tier.

4. The method according to claim 3, wherein $\Delta C'_i$ is determined in the following manner:
when $\Delta C_i \geq \theta$, $\alpha C'_i=1$;
when $$\Delta C_i < \theta, \Delta C'_i = \frac{\Delta C_i}{\theta},$$

wherein $\Delta C_i$ is the remaining storage capacity of the $i^{th}$ tier; $\theta$ is a threshold of $\Delta C_i$.

5. The method according to claim 3, wherein the density threshold of each of the plurality of tiers is calculated using the formula $\sigma_i=\rho_{i-1}+\rho_i$, wherein $\sigma_i$ is the density threshold of the $i^{th}$ tier, and $\sigma_0=0$, and $\sigma_0=0$.

6. The method according to claim 5, further comprises: determining that the data should be moved to the $i^{th}$ tier if $\sigma_{i-1}<\sigma_{data}<\sigma_i$.

* * * * *